US010677465B2

(12) United States Patent
Venturato et al.

(10) Patent No.: US 10,677,465 B2
(45) Date of Patent: Jun. 9, 2020

(54) COMBUSTOR MOUNTING ASSEMBLY HAVING A SPRING FINGER FOR FORMING A SEAL WITH A FUEL INJECTOR ASSEMBLY

(71) Applicant: General Electric Company, Schenectady, NY (US)

(72) Inventors: Marco Venturato, Cincinnati, OH (US); Douglas Downey Turner, West Chester, OH (US); Valeria Proano Cadena, Cincinnati, OH (US); Brian Michael Royer, Liberty Township, OH (US); Steven Craig Steffens, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 230 days.

(21) Appl. No.: 15/596,006

(22) Filed: May 16, 2017

(65) Prior Publication Data
US 2018/0335213 A1    Nov. 22, 2018

(51) Int. Cl.
*F23R 3/28*    (2006.01)
*F02C 3/06*    (2006.01)
*F23R 3/00*    (2006.01)
*F23R 3/50*    (2006.01)

(52) U.S. Cl.
CPC ............... *F23R 3/283* (2013.01); *F02C 3/06* (2013.01); *F23R 3/002* (2013.01); *F23R 3/50* (2013.01); *F05D 2220/32* (2013.01); *F05D 2240/35* (2013.01); *F23R 2900/00012* (2013.01); *F23R 2900/00017* (2013.01)

(58) Field of Classification Search
CPC .. F23R 3/60; F23R 3/283; F23R 3/002; F23R 3/50; F23R 2900/00012; F23R 2900/00017; H01T 13/08; F05D 2220/32; F05D 2240/35
See application file for complete search history.

(56) References Cited

U.S. PATENT DOCUMENTS

| 4,606,190 | A | * | 8/1986 | Greene | ................ F23C 7/004 60/39.23 |
| 5,117,624 | A | | 6/1992 | Roberts, Jr. et al. | |
| 5,237,820 | A | | 8/1993 | Kastl et al. | |

(Continued)

FOREIGN PATENT DOCUMENTS

CN    101545640 A    9/2009

*Primary Examiner* — Lorne E Meade
*Assistant Examiner* — Henry Ng
(74) *Attorney, Agent, or Firm* — Dority & Manning, P.A.

(57) ABSTRACT

A combustor assembly for a gas turbine engine is provided. The combustor assembly generally includes an annular dome and a liner that at least partially define a combustion chamber. The annular dome defines a plurality of circumferentially spaced fuel injection ports and a plurality of mounting assemblies are configured for receiving and supporting a plurality of fuel injector assemblies within the fuel injection ports. Each mounting assembly includes a ferrule positioned adjacent to and extending around a peripheral edge of the respective fuel injection port. A spring finger is coupled to an interior surface of the ferrule and extends toward a centerline of the fuel injection port to form a seal with the fuel injector assembly.

20 Claims, 6 Drawing Sheets

(56) References Cited

U.S. PATENT DOCUMENTS

| | | | |
|---|---|---|---|
| 5,581,999 A * | 12/1996 | Johnson | F23R 3/10 |
| | | | 60/756 |
| 5,630,319 A | 5/1997 | Schilling et al. | |
| 6,418,727 B1 * | 7/2002 | Rice | F01D 9/023 |
| | | | 60/799 |
| 6,658,853 B2 | 12/2003 | Matsuda et al. | |
| 8,104,291 B2 * | 1/2012 | Myers | F23R 3/002 |
| | | | 60/799 |
| 8,413,447 B2 * | 4/2013 | Cihlar | F23R 3/283 |
| | | | 60/740 |
| 8,459,042 B2 | 6/2013 | Lohmueller | |
| 8,528,336 B2 * | 9/2013 | Cihlar | F23R 3/283 |
| | | | 60/740 |
| 8,950,192 B2 | 2/2015 | Tschuor et al. | |
| 9,016,695 B2 | 4/2015 | Treat et al. | |
| 9,046,038 B2 * | 6/2015 | Stoia | F01D 25/28 |
| 9,097,130 B2 | 8/2015 | Willis et al. | |
| 2007/0137218 A1 * | 6/2007 | Prociw | F23R 3/283 |
| | | | 60/796 |
| 2008/0092547 A1 * | 4/2008 | Lockyer | F23R 3/002 |
| | | | 60/757 |
| 2011/0089267 A1 * | 4/2011 | Stoia | F02C 7/22 |
| | | | 239/589 |
| 2014/0069103 A1 | 3/2014 | Willis et al. | |
| 2014/0248120 A1 | 9/2014 | Graves | |
| 2016/0169522 A1 * | 6/2016 | Cunha | F23R 3/10 |
| | | | 60/740 |
| 2016/0356223 A1 | 12/2016 | Huang et al. | |
| 2017/0051713 A1 * | 2/2017 | Peters | F02M 53/046 |

* cited by examiner

COMBUSTOR MOUNTING ASSEMBLY HAVING A SPRING FINGER FOR FORMING A SEAL WITH A FUEL INJECTOR ASSEMBLY

FIELD

The present subject matter relates generally to a gas turbine engine, or more particularly to a combustor assembly for a gas turbine engine.

BACKGROUND

A gas turbine engine generally includes a fan and a core arranged in flow communication with one another. Additionally, the core of the gas turbine engine general includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Conventional combustor assemblies include fuel injectors that are inserted into fuel injection ports on combustor domes to provide a fuel/air mixture into the combustion chamber. During operation, and particularly during transient operation such as start-up when large temperature differences may be experienced, thermal expansion causes the fuel injectors and combustor domes to move relative to each other. To reduce stress between the components and ensure proper operation, a clearance gap is often provided around the fuel injectors. However, such a clearance gap can allow air leakage between the dome and the fuel injector, which is inefficient and can affect the combustion aerodynamics. Certain combustion assemblies use floating collars that surround the fuel injectors, but such collars can complicate assembly and may not sufficiently reduce the size of the clearance gap.

Accordingly, a gas turbine engine with an improved combustor assembly would be useful. More specifically, a combustor assembly that reduces the introduction of leakage air into the combustion chamber and simplifies assembly would be particularly beneficial.

BRIEF DESCRIPTION

Aspects and advantages of the invention will be set forth in part in the following description, or may be obvious from the description, or may be learned through practice of the invention.

In one exemplary embodiment of the present disclosure, a combustor assembly for a gas turbine engine defining an axial direction is provided. The combustor assembly includes an annular liner extending between a forward end and an aft end generally along the axial direction and an annular dome positioned forward of the annular liner along the axial direction, the annular dome and the annular liner at least partially defining a combustion chamber. A plurality of fuel injection ports are defined by and spaced circumferentially around the annular dome, each of the fuel injection ports defining a peripheral edge, a centerline, and a radial direction perpendicular to the centerline. A plurality of fuel injector assemblies extend through the plurality of fuel injection ports and a plurality of mounting assemblies are operably coupled to one of the plurality of fuel injection ports and include a ferrule positioned adjacent to and extending around the peripheral edge of one of the plurality of fuel injection ports, the ferrule defining an interior surface along the radial direction. A spring finger has a first end coupled to the interior surface of the ferrule and a second end extending toward the centerline of the fuel injection port.

In another exemplary embodiment of the present disclosure, a gas turbine engine defining an axial direction is provided. The gas turbine engine includes a compressor section; a turbine section mechanically coupled to the compressor section through a shaft; and a combustor assembly disposed between the compressor section and the turbine section. The combustor assembly includes an annular liner extending between a forward end and an aft end generally along the axial direction and an annular dome positioned forward of the annular liner along the axial direction, the annular dome and the annular liner at least partially defining a combustion chamber. A plurality of fuel injection ports are defined by and spaced circumferentially around the annular dome, each of the fuel injection ports defining a peripheral edge, a centerline, and a radial direction perpendicular to the centerline. A plurality of fuel injector assemblies extend through the plurality of fuel injection ports and a plurality of mounting assemblies are operably coupled to one of the plurality of fuel injection ports and include a ferrule positioned adjacent to and extending around the peripheral edge of one of the plurality of fuel injection ports, the ferrule defining an interior surface along the radial direction. A spring finger has a first end coupled to the interior surface of the ferrule and a second end extending toward the centerline of the fuel injection port.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "forward" and "aft" refer to relative positions within a gas turbine engine, with forward referring to a position closer to an engine inlet and aft referring to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

The present disclosure is generally directed to a combustor assembly for a gas turbine engine. The combustor assembly generally includes an annular dome and a liner that at least partially define a combustion chamber. The annular dome defines a plurality of circumferentially spaced fuel injection ports and a plurality of mounting assemblies are configured for receiving and supporting a plurality of fuel injector assemblies within the fuel injection ports. Each mounting assembly includes a ferrule positioned adjacent to and extending around a peripheral edge of the respective fuel injection port. A spring finger is coupled to an interior surface of the ferrule and extends toward a centerline of the fuel injection port to form a seal with the fuel injector assembly.

Figure 1:
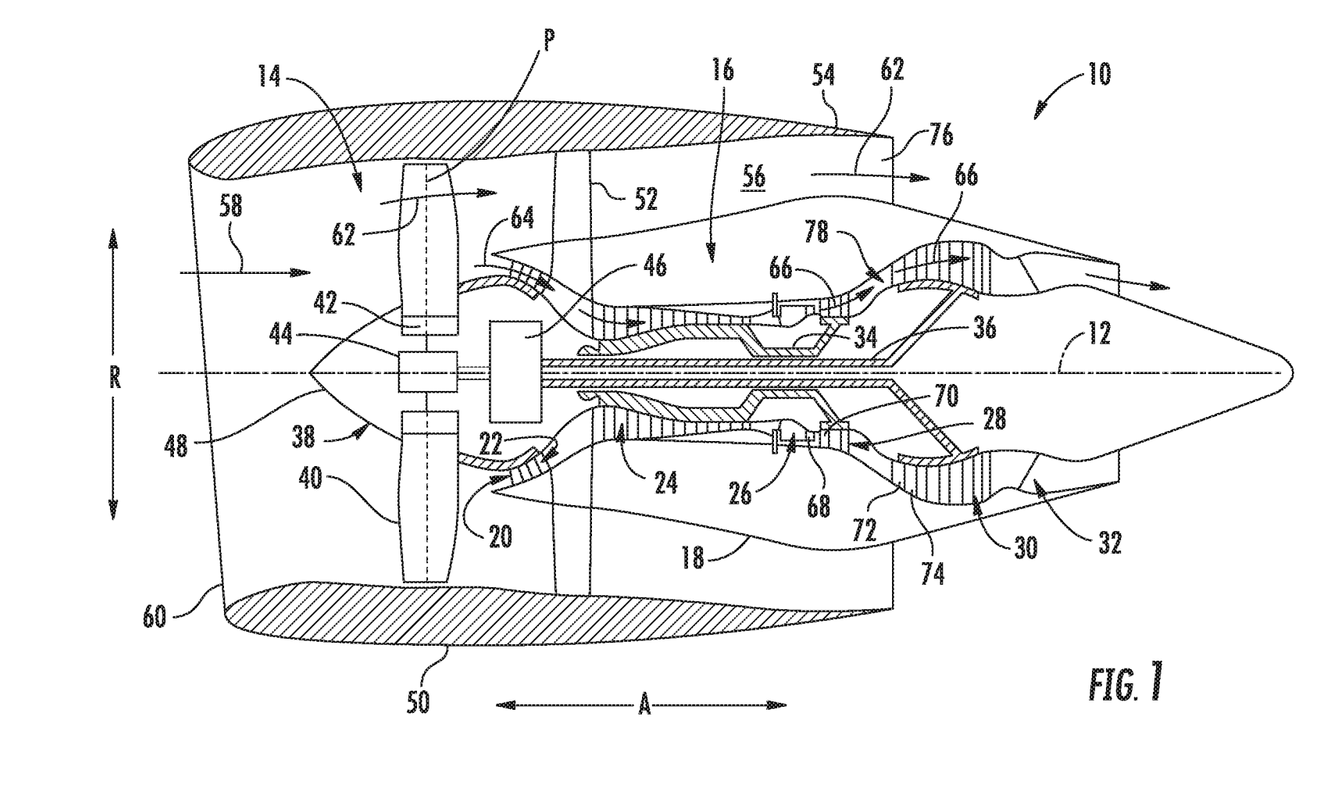
FIG. 1 is a schematic cross-sectional view of an exemplary gas turbine engine according to various embodiments of the present subject matter.

Referring now to the drawings, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline or central axis 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustor or combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal axis 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated that the exemplary turbofan 10 depicted in FIG. 1 is by way of example only and that in other exemplary embodiments, turbofan 10 may have any other suitable configuration. For example, it should be appreciated that in other exemplary embodiments, turbofan 10 may instead be configured as any other suitable turbine engine, such as a turboprop engine, turbojet engine, internal combustion engine, etc.

Figure 2:
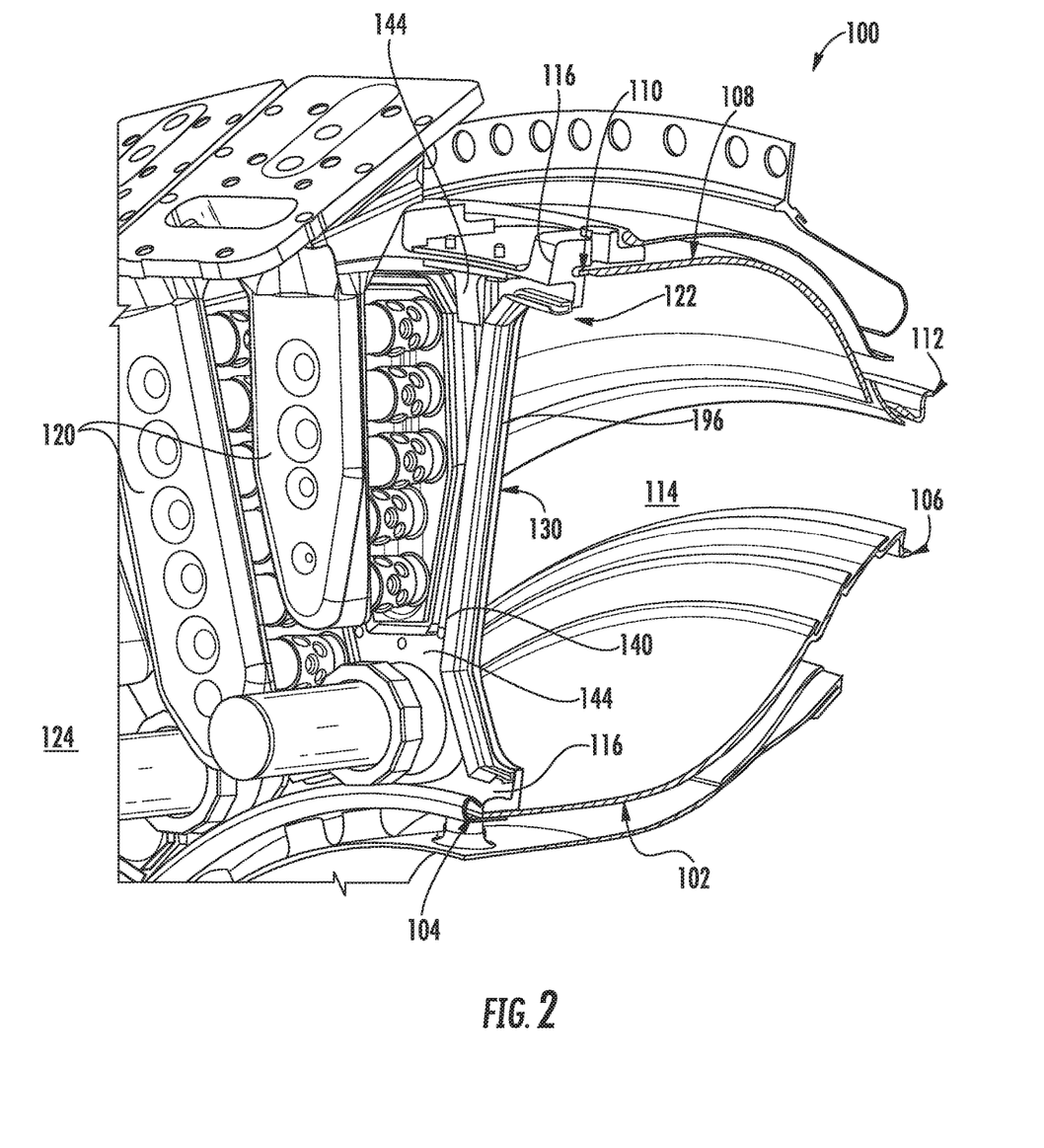
FIG. 2 is a perspective, cross-sectional view of a combustor assembly in accordance with an exemplary embodiment of the present disclosure.

Referring now to FIG. 2, a perspective, a cross-sectional view is provided of a combustor assembly 100 in accordance with an exemplary embodiment of the present disclosure. For example, combustor assembly 100 of FIG. 2 may be positioned in the combustion section 26 of the exemplary turbofan engine 10 of FIG. 1. Notably, FIG. 2 illustrates only portions of combustor assembly 100 for the purpose of explaining aspects of the present subject matter, while other components are removed for clarity. In addition, combustor assembly 100 is only one exemplary combustor and other types and configurations of combustor assemblies may be used according to alternative embodiments.

As shown, the combustor assembly 100 generally includes an inner liner 102 extending between a forward end 104 and an aft end 106 generally along the axial direction A. In addition, combustor assembly 100 includes an outer liner 108 extending between a forward end 110 and an aft end 112 generally along the axial direction A. According to the illustrated embodiment, inner liner 102 and outer liner 108 each include a liner portion and a baffle portion spaced apart from and surrounding the liner portion. In this manner, for example, inner liner 102 and outer liner 108 define a plenum through which cooling air may be distributed along the liner. Other configurations of inner liner 102 and outer liner 108 may be used while remaining within the scope of the present subject matter. For example, the liners may include a plurality of film cooling holes, may have different shapes, and may include other cooling or air distribution features.

As illustrated, inner liner 102 and outer liner 108 together at least partially define a combustion chamber 114 therebetween. In addition, inner liner 102 and outer liner 108 are each attached to an annular dome 116. More particularly, combustor assembly 100 includes annular dome 116 positioned forward of inner liner 102 and outer liner 108 along the axial direction A. Forward end 104 of inner liner 102 and forward end 110 of outer liner 108 are attached to annular dome 116 in any suitable manner. According to one exemplary embodiment, annular dome 116 defines an inner annular slot and an outer annular slot for receipt of the forward ends 104, 110 of liners 102, 108, respectively.

Combustor assembly 100 further includes a plurality of fuel injector assemblies, referred to herein as fuel injectors 120. Fuel injectors 120, such as premixers, fuel-air mixers, or similar assemblies, are generally configured for supplying a mixture of fuel and air into combustion chamber 114 to facilitate combustion. The fuel injectors 120 are spaced circumferentially around annular dome 116 and positioned within or extending through a plurality of circumferentially-spaced fuel injection ports 122.

More specifically, referring still to FIG. 2, annular dome 116 defines a plurality of fuel injection ports 122 spaced circumferentially around annular dome 116. Fuel injection ports 122 receive fuel injectors 120 to generally control the flow of fuel and compressed air into combustion section 114. For example, relatively high pressure compressed air from high pressure compressor 24 is provided into a high pressure plenum 124 defined between the combustor and a combustor casing (not shown). Fuel injectors 120 selectively mix the relatively high pressure compressed air with fuel in the desired proportion and supply the fuel-air mixture to the relatively low pressure combustion chamber 114.

Figure 5:
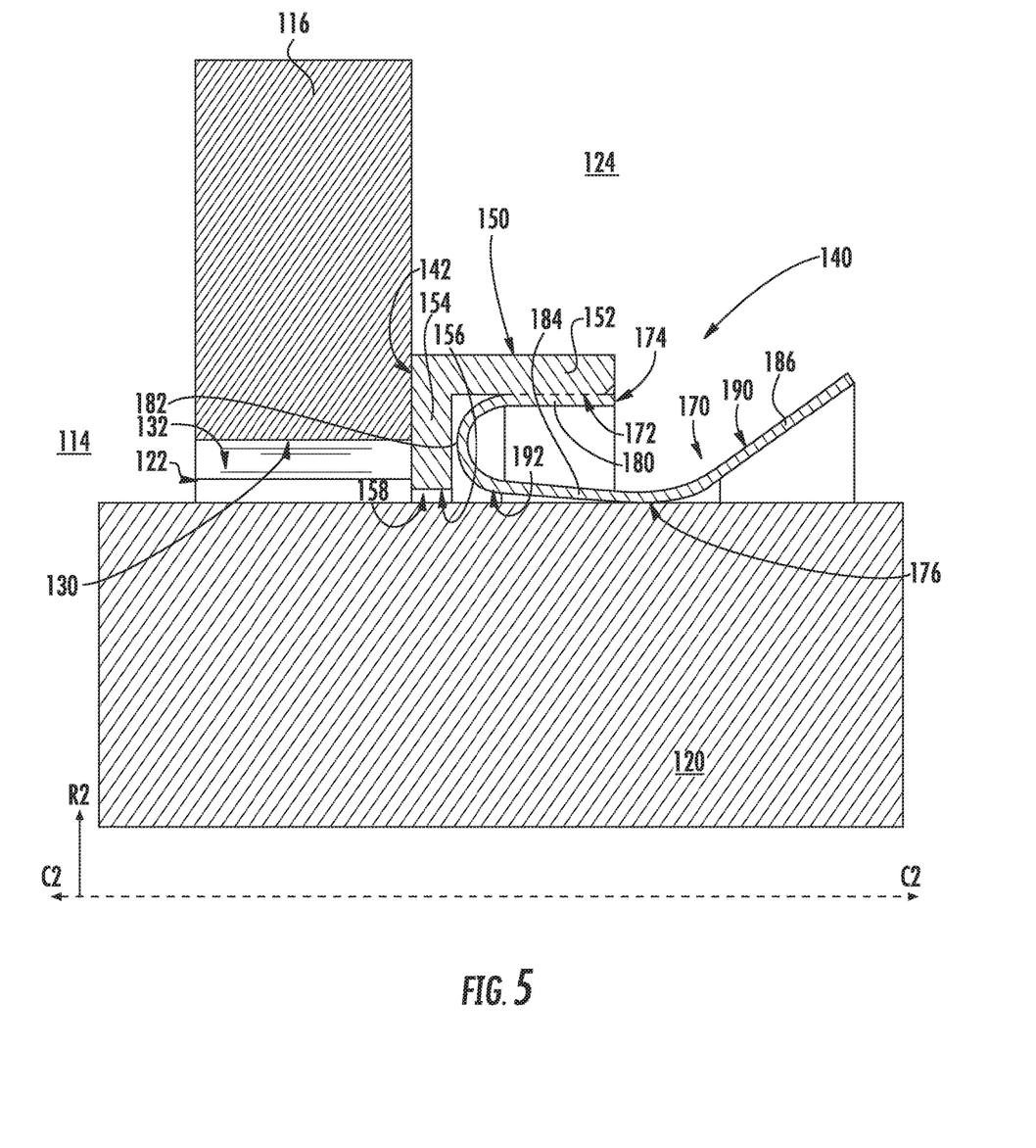
FIG. 5 is another cross-sectional view of the exemplary mounting assembly of FIG. 3.

Each fuel injection port 122 defines a peripheral edge 130, a centerline C2, and a radial direction R2 perpendicular to the centerline C2 (see FIG. 5). Fuel injection ports 122 and peripheral edges 130 are generally shaped to receive fuel injectors 120. For example, conventional fuel injectors are substantially circular and may be received within circular injection ports. However, according to the illustrated exemplary embodiment, fuel injectors 120 are non-circular and fuel injection ports 122 are substantially the same shape. It should be appreciated, that as used herein, terms of approximation, such as "approximately," "substantially," or "about," refer to being within a ten percent margin of error.

Notably, as explained briefly above, positioning fuel injectors 120 within fuel injection ports 122 presents a problem due to the differing mechanical characteristics of the components. More specifically, because the components are attached to different portions of turbofan engine 10, are constructed of materials having different coefficients of thermal expansion, and are exposed to different temperatures, thermal expansion can cause significant relative movement between the fuel injectors 120 and the fuel injection ports 122. Accordingly, fuel injection ports 122 are sized to define a clearance gap 132 between peripheral edge 130 and fuel injectors 120. Clearance gap 132 accommodates relative thermal expansion to reduce potential stresses between the components while ensuring operability of combustor assembly 100. However, clearance gap 132 also allows some air leakage between annular dome 116 and the fuel injectors 120, which is inefficient and can affect the combustion aerodynamics.

Therefore, combustor assembly 100 further includes a plurality of mounting assemblies 140 which are generally configured for receiving and supporting fuel injectors 120 within fuel injection ports 122. For example, as will be described below, mounting assemblies 140 are configured for reducing or eliminating leakage between annular dome 116 and fuel injectors 120 while allowing relative movement between the two components. In this regard, referring again to FIG. 2, mounting assemblies 140 are generally coupled to fuel injection ports 122 in floating engagement such that fuel injectors 120 may float within fuel injection ports 122 while an aft face 142 (FIG. 5) maintains at least a partial seal with annular dome 116. As illustrated, combustor assembly 100 may further include one or more retention members 144 (which may include both radially inner and outer retention members 144) for retaining mounting assemblies 140 within combustor assembly 100. For example, according to the illustrated embodiment, outer retention members 144 are T-shaped brackets mounted to annular dome 116 and positioned between adjacent mounting assemblies 140 to retain mounting assemblies 140 while allowing some movement relative to annular dome 116.

Figure 3:
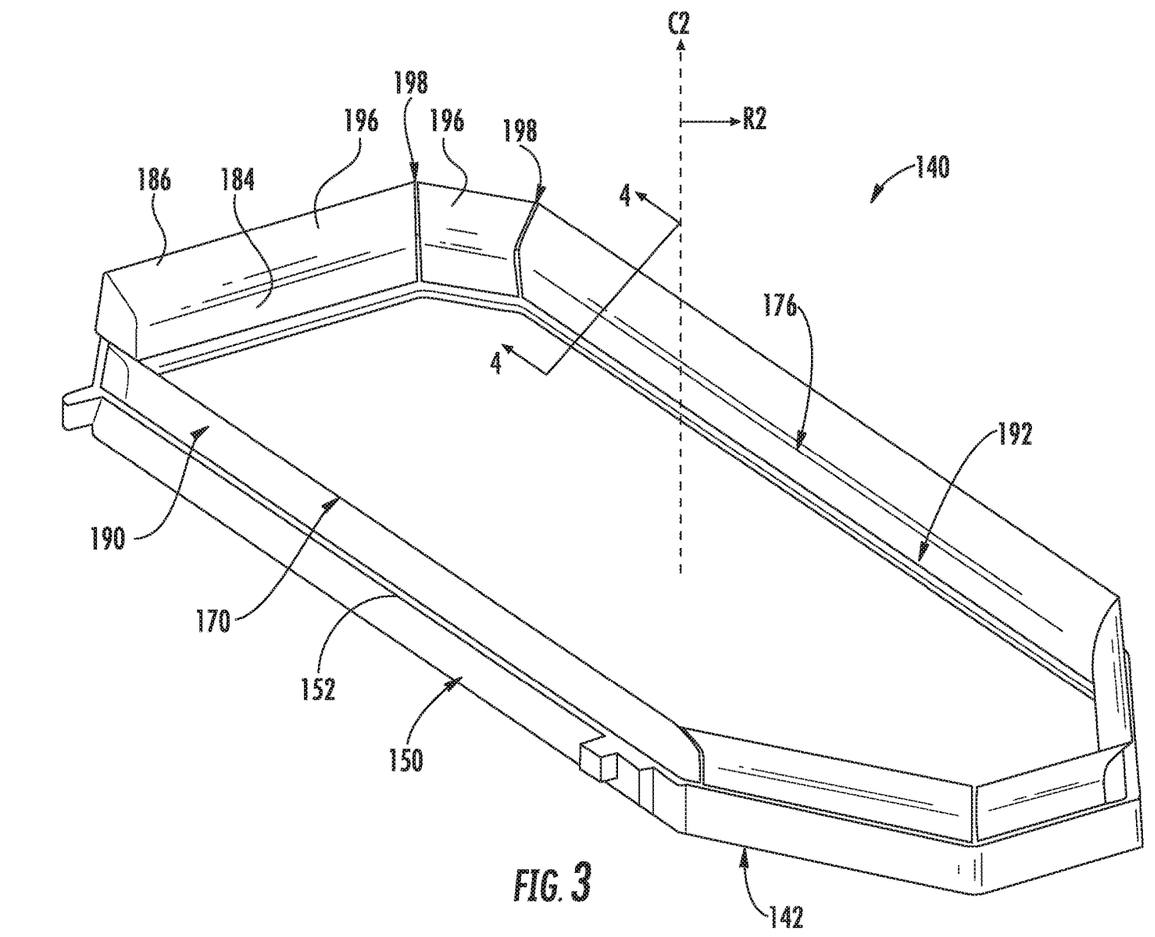
FIG. 3 is a perspective view a mounting assembly of the exemplary combustor assembly of FIG. 2 according to an exemplary embodiment of the present subject matter.
Figure 4:
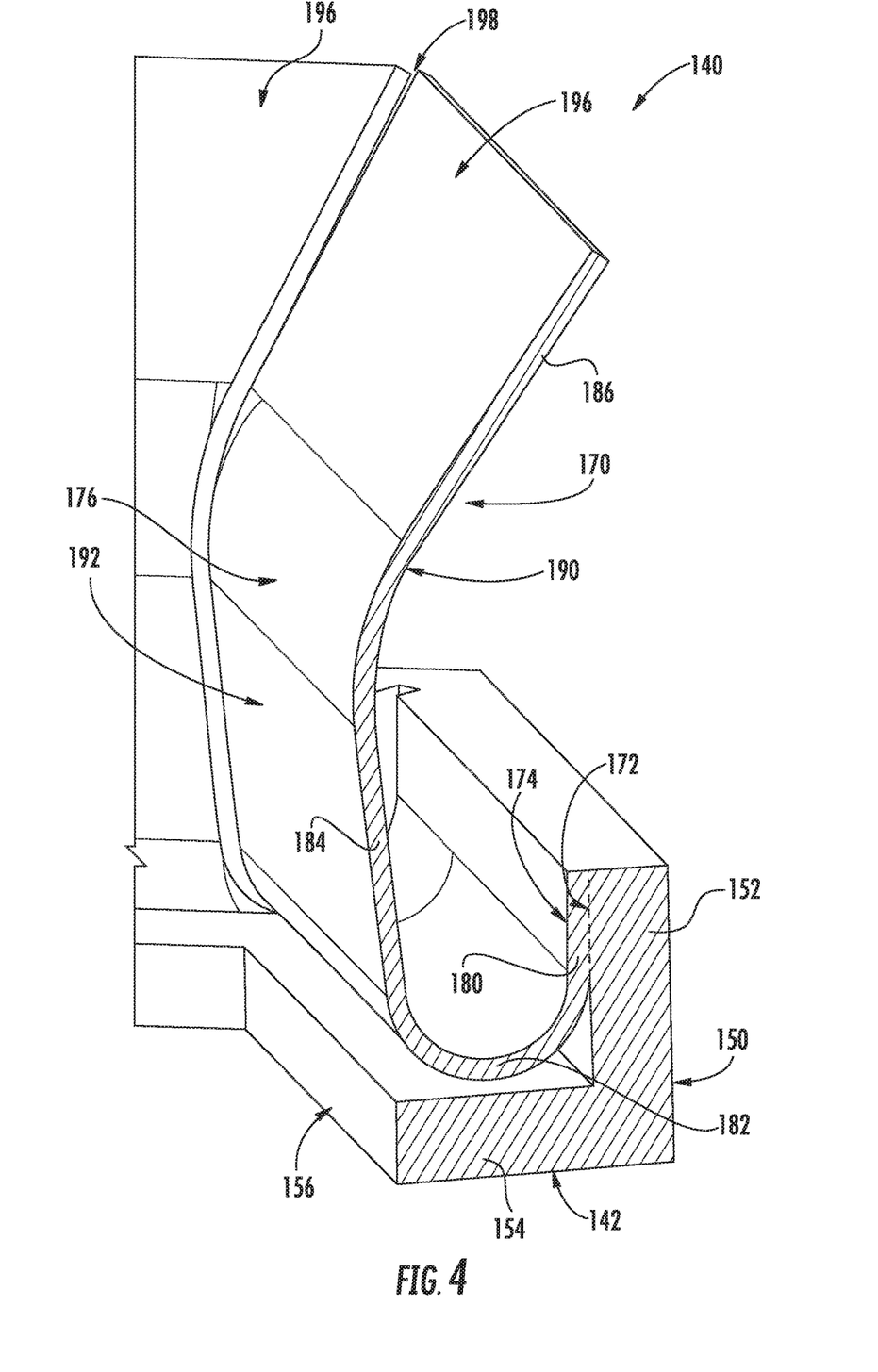
FIG. 4 is a perspective, cross-sectional view of the exemplary mounting assembly of FIG. 3 taken along Line 4-4 of FIG. 3.
Figure 6:
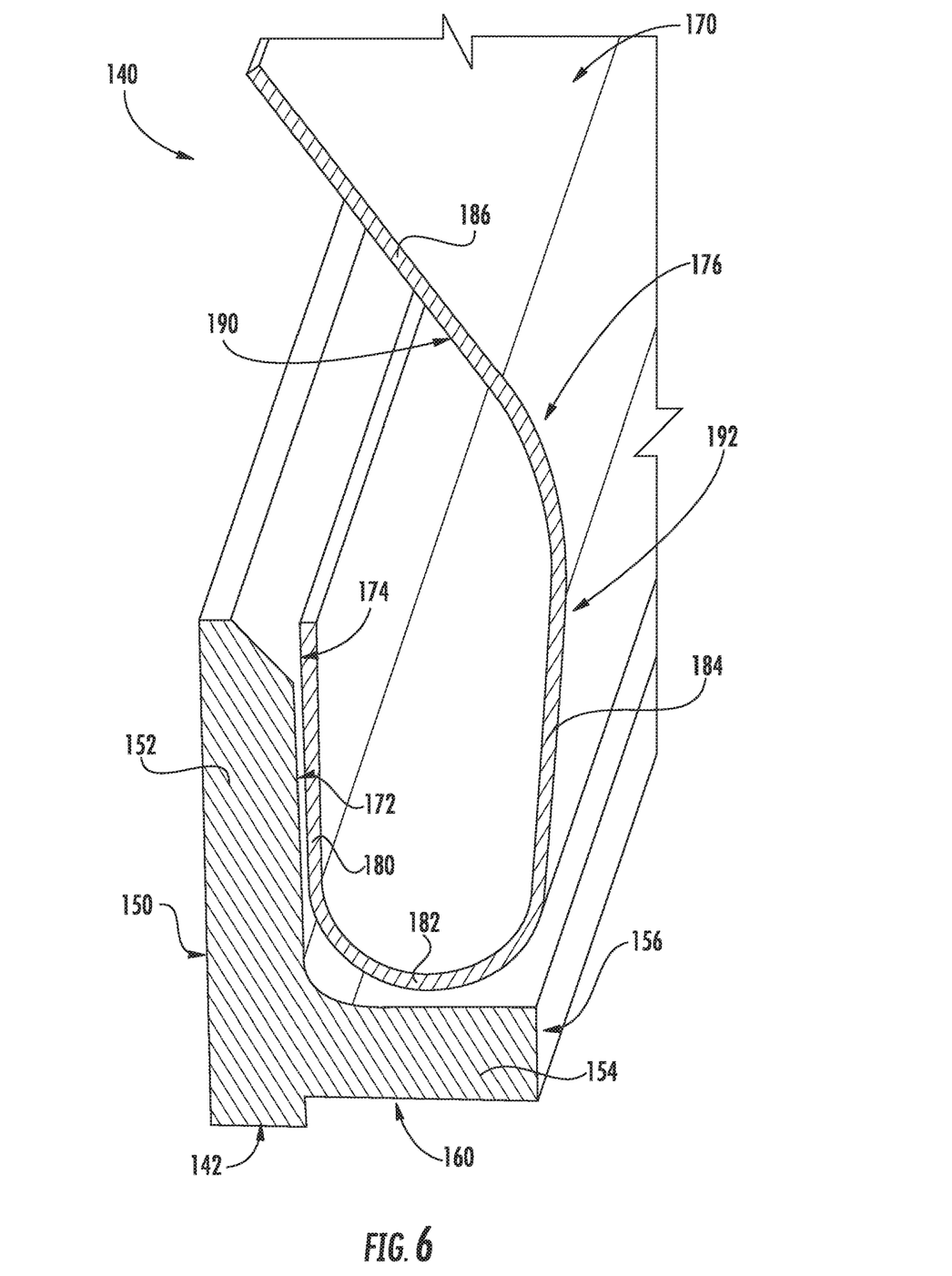
FIG. 6 is a cross-sectional view of a mounting assembly of the exemplary combustor assembly of FIG. 2 according to another embodiment of the present subject matter.

Referring now generally to FIGS. 3 through 6, various mounting assemblies 140 will be described according to exemplary embodiments of the present subject matter. Each mounting assembly 140 generally includes a ferrule 150 positioned adjacent to and extending around peripheral edge 130 of the respective fuel injection port 122. As best illustrated in FIGS. 4 through 6, ferrule 150 generally includes an axial flange 152 extending substantially along the axial direction A and a radial flange 154 extending from axial flange 152 toward centerline C2 along the radial direction R2.

In this regard, aft face 142 of ferrule 150 forms at least a partial seal with annular dome 116 while radial flange 154 extends toward fuel injectors 120 to reduce the size of clearance gap 132. In this regard, for example, when fuel injectors 120 is mounted within mounting assembly 140, a radially inner surface 156 of ferrule 150 and fuel injectors 120 define a ferrule gap 158 that is smaller than clearance gap 132, thus resulting in less leakage air into combustion chamber 114.

As illustrated in FIG. 4, radial flange 154 extends from an aft end of axial flange 152 and forms a face seal with annular dome 116, thereby allowing little leakage through the dome/ferrule interface. However, according to alternative embodiments as illustrated in FIG. 6, ferrule 150 may define a recess 160 positioned between annular dome 116 and radial flange 154 along the axial direction A. Recess 160 allows the pressure differential to be applied across a larger area, increasing the force pushing ferrule 150 against annular dome 116.

To provide a better seal between mounting assembly 140 and fuel injectors 120, mounting assembly 140 further includes a spring finger 170 that generally extends from ferrule 150 and engages fuel injectors 120 to create a fluid seal or at least minimize a gap between mounting assembly 140 and fuel injectors 120. According to the illustrated embodiment, spring finger 170 is mounted to an interior surface 172 of axial flange, e.g., a radially inner surface positioned forward of radial flange 154. More specifically, spring finger 170 has a first end 174 that is coupled to interior surface 172 and spring finger 170 extends toward the centerline C2 of fuel injection port 122 toward a contact region 176 of spring finger 170. According to the illustrated embodiment of FIG. 6, ferrule 150 may define a chamfered end proximate first end 174 to allow braze rope to be applied and spring finger 170 to be brazed to ferrule 150.

Spring finger 170 may generally be any shape suitable for extending from ferrule 150 to engage and seal against fuel injectors 120. However, according to the illustrated embodiment, spring finger 170 includes a first segment 180 extending from first end 174 toward annular dome 116 substantially along the axial direction A. A second segment 182 that bends approximately 180 degrees away from annular dome 116, e.g., toward fuel injectors 120 and a forward portion of mounting assembly 140. A third segment 184 extends further away from annular dome 116 and toward the centerline C2 of the fuel injection port 122, e.g., terminating in contact region 176 which forms a seal with fuel injectors 120. According to the exemplary embodiment, spring finger 170 further includes a fourth segment 186 that flares out away from the centerline C2 and annular dome 116, e.g., to simplify assembly of fuel injectors 120 within mounting assembly 140.

When configured as shown in the illustrated embodiment, spring finger 170 is in spring-loaded contact with fuel injectors 120. In this manner, leakage between mounting assembly 140 and fuel injectors 120 may be reduced or eliminated. In addition, spring finger 170 defines a high pressure surface 190 exposed to high pressure compressed air within high pressure plenum 124 and a low pressure surface 192 on the radially inner surface of spring finger 170. Therefore, the pressure difference across spring finger 170 further urges contact region 176 to firmly engage fuel injectors 120 and form a tight seal. By contrast, however, the hairpin configuration of spring finger 170 still has enough resiliency and flexibility to allow for the necessary movement between fuel injectors 120 and annular dome 116.

However, it should be appreciated that according to alternative embodiments, spring finger 170 could have a slight gap when compressed air is not being supplied to high pressure plenum 124. In such an embodiment, a gap is defined between spring finger 170 and fuel injectors 120 such that pressure exerted on high pressure surface 190 of spring finger 170 during operation bends spring finger 170 to create a seal with fuel injectors 120. Other configurations, shapes, and sizes of spring finger 170 are possible and are contemplated as within the scope of the present subject matter.

Notably, mounting assembly 140 as described above may have any suitable shape for receiving a complementary fuel injectors 120. However, referring generally to FIGS. 2 and 3, fuel injectors 120, fuel injection ports 122, and mounting assemblies 140 each have a non-circular profile. Referring to mounting assembly 140 for example, ferrule 150 and spring finger 170 each include a plurality of longitudinal segments 196 that are coupled to each other in a plane perpendicular to the centerline C2 or parallel with a surface of annular dome 116. More specifically, as illustrated, each have eight substantially linear longitudinal segments 196. Although eight longitudinal segments 196 are illustrated, forming an elongated octagon, it should be appreciated that any suitable number of linear segment, non-linear segments, or both may be used according to alternative embodiments.

Because the spring finger 170 is intended to flex and move during operation of turbofan engine 10, each of the longitudinal segments 196 of spring finger 170 are separated by a gap 198 which allows relative motion between adjacent longitudinal segments 196 and proper sealing with fuel injectors 120. For example, gap 198 may be a less than a millimeter, e.g., about 0.25 millimeters, or any other suitable size. It should be appreciated that ferrule 150 and spring finger 170 as described herein are used only as examples for explaining aspects of the present subject matter. Variations and modifications to these components may be made to reduce air leakage and allow relative movement of components while remaining within the scope of the present subject matter.

In aeroderivative gas turbine engines, fuel injector assemblies such as premixers are attached to the outer case of the engine and must interface with the annular dome of the combustor assembly. Due to the relative movement between these components, e.g., due to thermal expansion, a clearance gap is defined between the fuel injector and the dome. The mounting assembly described herein is designed to accommodate relatively large amounts of relative movement between the components while reducing the gap and therefore the air leakage between a fuel injector assembly and an annular dome of a combustor. This reduced leakage has benefits in the performance of the engine as the amount of air available can be used for more beneficial cooling or combustion. Additionally, the reduced leakage decreases the effects of the leaked air on the combustion aerodynamics, benefiting the flame structure and emissions. In sum, the mounting assemblies described herein improved the operability, efficiency, and performance of combustor assemblies and gas turbine engines.

Additionally, although mounting assemblies 140 as described above are used for generating a seal between fuel injector assemblies 120 and annular dome 116, it should be appreciated that mounting assemblies 140 may be used in alternative applications for providing a suitable seal between any two components that translate relative to each other. For example, mounting assemblies can also be used in other locations within combustion section 26, such as borescope and igniter interfaces with outer liner 108. In addition, mounting assemblies 140 can be used to provide seals in other locations within a combustor, within turbofan engine 10, or in any other suitable location or application.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A combustor assembly for a gas turbine engine, the gas turbine engine defining an axial direction, the combustor assembly comprising:
   an annular liner extending between a forward end and an aft end generally along the axial direction;
   an annular dome positioned forward of the annular liner along the axial direction and defining a forward face, the annular dome and the annular liner at least partially defining a combustion chamber;
   a plurality of fuel injection ports defined by and spaced circumferentially around the annular dome, each of the fuel injection ports defining a peripheral edge, a centerline, and a radial direction perpendicular to the centerline; and
   a plurality of mounting assemblies, each of the plurality of mounting assemblies operably coupled to one of the plurality of fuel injection ports and comprising:
      a ferrule positioned adjacent to and extending around the peripheral edge of one of the plurality of fuel injection ports, the ferrule comprising a radial flange extending along the radial direction, the radial flange defining an aft face that is in direct contact with the forward face of the annular dome, the ferrule further comprising an axial flange that extends from the radial flange away from the annular dome substantially along the axial direction, wherein an interior surface is defined on the axial flange; and
      a spring finger having a first end coupled to the interior surface of the ferrule and a second end extending toward the centerline of the fuel injection port and away from the combustion chamber along the axial direction.

2. The combustor assembly of claim 1, wherein the spring finger comprises a plurality of longitudinal segments, each of the longitudinal segments being separated by a gap.

3. The combustor assembly of claim 2, wherein the plurality of longitudinal segments are substantially linear.

4. The combustor assembly of claim 2, wherein the ferrule and the spring finger comprise eight longitudinal segments.

5. The combustor assembly of claim 1, wherein the spring finger comprises a first segment extending from the first end toward the annular dome substantially along the axial direction, a second segment that bends approximately 180 degrees away from the annular dome, and a third segment that extends away from the annular dome and toward the centerline of the fuel injection port.

6. The combustor assembly of claim 5, wherein the spring finger further comprises a fourth segment that flares out away from the centerline.

7. The combustor assembly of claim 1, further comprising:
   a plurality of fuel injector assemblies extending through the plurality of fuel injection ports, wherein each of the plurality of mounting assemblies receives and supports one of the plurality of fuel injector assemblies.

8. The combustor assembly of claim 7, wherein each spring finger is in spring loaded contact with one of the plurality of fuel injector assemblies.

9. The combustor assembly of claim 7, wherein each spring finger rests immediately adjacent one of the respective fuel injector assemblies such that a gap is defined between the spring finger and the respective fuel injector assembly, and wherein a pressure exerted on an outside surface of the spring finger seals the spring finger against the respective fuel injector assembly.

10. The combustor assembly of claim 1, wherein each of the plurality of mounting assemblies is in floating engagement with the respective fuel injection port such that an aft face of the ferrule is movable relative to the annular dome.

11. The combustor assembly of claim 1, wherein each of the plurality of fuel injection ports is non-circular.

12. The combustor assembly of claim 1, wherein the radial flange defines a recess positioned between the annular dome and the radial flange along the axial direction.

13. The combustor assembly of claim 1, further comprising:
   one or more retention members coupled to the annular dome and positioned between adjacent mounting assemblies for restricting the movement of the mounting assemblies relative to the annular dome.

14. The combustor assembly of claim 1, wherein the aft face of the ferrule forms at least a partial fluid seal with the annular dome.

15. The combustor assembly of claim 1, wherein the plurality of mounting assemblies are mounted in floating engagement with the plurality of fuel injection ports.

16. A gas turbine engine defining an axial direction, the gas turbine engine comprising:
   a compressor section;
   a turbine section mechanically coupled to the compressor section through a shaft; and
   a combustor assembly disposed between the compressor section and the turbine section, the combustor assembly comprising:
      an annular liner extending between a forward end and an aft end generally along the axial direction;
      an annular dome positioned forward of the annular liner along the axial direction and defining a forward face, the annular dome and the annular liner at least partially defining a combustion chamber;
      a plurality of fuel injection ports defined by and spaced circumferentially around the annular dome, each of the fuel injection ports defining a peripheral edge, a centerline, and a radial direction perpendicular to the centerline;
      a plurality of fuel injector assemblies extending through the plurality of fuel injection ports; and
      a plurality of mounting assemblies, each of the plurality of mounting assemblies operably coupled to one of the plurality of fuel injection ports and comprising:
         a ferrule positioned adjacent to and extending around the peripheral edge of one of the plurality of fuel injection ports, the ferrule comprising a radial flange extending along the radial direction, the radial flange defining an aft face that is in direct contact with the forward face of the annular dome, the ferrule further comprising an axial flange that extends from the radial flange away from the annular dome substantially along the axial direction, wherein an interior surface is defined on the axial flange; and a spring finger having a first end coupled to the interior surface of the ferrule and a second end extending toward the centerline of the fuel injection port and away from the combustion chamber along the axial direction.

17. The gas turbine engine of claim 16, wherein the spring finger comprises a plurality of longitudinal segments, each of the longitudinal segments being substantially linear and separated by a gap.

18. The gas turbine engine of claim 16, wherein the spring finger comprises a first segment extending from the first end toward the annular dome substantially along the axial direction, a second segment that bends approximately 180 degrees away from the annular dome, a third segment that extends away from the annular dome and toward the centerline of the fuel injection port, and a fourth segment that flares out away from the centerline.

19. The gas turbine engine of claim 16, wherein each spring finger is in spring loaded contact with one of the plurality of fuel injector assemblies.

20. The gas turbine engine of claim 16, wherein the radial flange extends from the axial flange toward the centerline along the radial direction.

* * * * *